US010608927B2

(12) United States Patent
Gandhi (10) Patent No.: US 10,608,927 B2
(45) Date of Patent: Mar. 31, 2020

(54) SYSTEM AND METHOD FOR PROVIDING SMALL CELL GATEWAY REDUNDANCY

(71) Applicant: Cisco Technology, Inc., San Jose, CA (US)

(72) Inventor: Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 59 days.

(21) Appl. No.: 15/937,495

(22) Filed: Mar. 27, 2018

(65) Prior Publication Data
US 2018/0219768 A1    Aug. 2, 2018

Related U.S. Application Data

(63) Continuation of application No. 14/838,139, filed on Aug. 27, 2015, now Pat. No. 9,948,548.

(51) Int. Cl.
*H04L 12/703* (2013.01)
*H04L 12/707* (2013.01)
*H04W 24/02* (2009.01)
*H04W 84/04* (2009.01)

(52) U.S. Cl.
CPC .............. *H04L 45/28* (2013.01); *H04L 45/22* (2013.01); *H04W 24/02* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 7,652,984 B1 | 1/2010 | Kotecha | |
| 8,582,544 B2 | 11/2013 | Qiu et al. | |
| 8,654,709 B2 | 2/2014 | Centonza et al. | |
| 8,687,556 B2 | 4/2014 | Eipe et al. | |
| 8,693,367 B2 | 4/2014 | Chowdhury et al. | |
| 8,750,098 B2 | 6/2014 | Fan et al. | |
| 9,173,155 B2 | 10/2015 | Kamalaraj et al. | |
| 9,351,207 B2* | 5/2016 | Gorey | H04W 36/04 |

(Continued)

FOREIGN PATENT DOCUMENTS

WO    2013009892 A1    1/2013

OTHER PUBLICATIONS

"Cell ID," from Wikipedia, the Free Encyclopedia, Jan. 26, 2016, 3 pages.

(Continued)

*Primary Examiner* — Shripal K Khajuria
(74) *Attorney, Agent, or Firm* — Patterson + Sheridan, LLP (57) ABSTRACT

An example method is provided and may include steps of configuring a HeNB with plurality of global eNode B identities (global eNB IDs), where each global eNB ID is associated with one of a plurality of HeNB gateways (HeNB-GWs), and broadcasting a first global eNB ID by the HeNB when the HeNB is served by a first HeNB-GW. When/if the HeNB loses connectivity with the first HeNB-GW, the method provides a step of switching the broadcasting from the first global eNB ID to a second global eNB ID and re-parenting the HeNB, now broadcasting or is configured to start/continue broadcasting the second global eNB ID, from being served by the first HeNB-GW to being served by a second HeNB-GW.

20 Claims, 8 Drawing Sheets

(56) References Cited

U.S. PATENT DOCUMENTS

| | | | |
|---|---|---|---|
| 2010/0075698 | A1 | 3/2010 | Rune et al. |
| 2011/0158171 | A1 | 6/2011 | Centonza et al. |
| 2011/0171979 | A1 | 7/2011 | Rune |
| 2011/0243097 | A1* | 10/2011 | Lindqvist .............. H04W 24/02 370/331 |
| 2012/0023360 | A1 | 1/2012 | Chang et al. |
| 2012/0057496 | A1 | 3/2012 | Jin et al. |
| 2012/0257602 | A1* | 10/2012 | Takahashi ......... H04W 36/0061 370/336 |
| 2012/0309395 | A1* | 12/2012 | Centonza ............ H04W 84/045 455/436 |
| 2013/0150037 | A1* | 6/2013 | Jha ........................ H04W 76/36 455/435.1 |
| 2013/0163424 | A1 | 6/2013 | Goerke et al. |
| 2014/0177434 | A1* | 6/2014 | Cartmell ............. H04L 41/0668 370/221 |
| 2015/0257180 | A1* | 9/2015 | Liu ..................... H04L 41/0803 455/452.1 |
| 2017/0063671 | A1 | 3/2017 | Gandhi |
| 2017/0134996 | A1* | 5/2017 | Wang .................... H04W 12/04 |

OTHER PUBLICATIONS

"Cisco Universal Small Cell Geo-Redundancy Feature Description; Document Version: 1.0" Cisco Systems, Inc., Jun. 9, 2015; 10 pages.

Kybett, Richard, et al., "Multistandard Transceiver IC enabling low cost Femtocell deployment," Technical Whitepaper, Lime Microsystems, Published on or about Jul. 18, 2009; 7 pages.

"IP in IP," from Wikipedia, the Free Encyclopedia, Sep. 9, 2015; 4 pages.

"Femtocell," from Wikipedia, the Free Encyclopedia, Jan. 31, 2016; 12 pages.

"IP in IP Encapsulation," RFC Sourcebook, Published on or about Oct. 12, 2004; 5 pages.

"Tomorrow Starts Here," Presentation by Djordje Vulovic, Cisco Connect, Apr. 2-4, 2014, Split, Croatia; 33 pages.

"Cisco SON Automated Neighbor Relations for Heterogeneous Networks (HANR-U)," Cisco Systems, Inc., Aug. 2013, 2 pages.

"3GPP UMTS HNB IMS Architectures," conningtech.files.wordpress.com, Jan. 21, 2016; 10 pages.

TR-069 CPE WAN Management Protocol, Issue: 1 Amendment 5, Issue Date: Nov. 2013, CWMP Version 1.4, Broadband Forum Technical Report, Nov. 2013, The Broadband Forum. All Rights Reserved; 228 pages.

'TR-196 Femto Access Point Service Data Model, Issue: 2, Issue Date: Nov. 2011/' Broadband Forum Technical Report, © The Broadband Forum. All Rights Reserved; 46 pages.

'ETSI-TS-124-301 V9.4.0 (Oct. 2010) Technical Specification: Universal Mobile Telecommunications System (UMTS); LTE; Non-Access-Stratum (NAS) protocol for Evolved Packet System (EPS); Stage 3 (3GPP TS 24.301 version 9.40 Release 9)/' ETSI 3rd Generation Partnership Project, European Telecommunications Standards Institute, Oct. 2010, Section 5.5.3.2.4, 283 pages.

'ETSI-TS-136-300 VII.9.0 (Mar. 2014) Technical Specification: LTE; Evolved Universal Terrestrial Radio Access (E-UTRA) and Evolved Universal Terrestrial Radio Access Network E-UTRAN); Overall description; Stage 2 (3GPP TS 36.300 version 11.9.0 Release 11)/' ETSI 3rd Generation Partnership Project, European Telecommunications Standards Institute, Mar. 2014, Section 7-10, pp. 56-95).

"3GPP TS 36.413 V13.0.0 (Jun. 2015) Technical Specification Group Radio Access Network; Evolved Universal Terrestrial Radio Access Network (E-UTRAN); S1 Application Protocol (S1AP) (Release 13)," 3rd Generation Partnership Project, European Telecommunications Standards Institute, Jun. 2015, 302 pages.

"Scalable Offloading and Security for 3G/LTE Small Cell Networks," Communications Technologies, Hong Kong Applied Science and Technology Research Institute Company Limited, Aug. 11, 2015, 2 pages.

'3GPP TS 36.300 V13.0.0 (Jun. 2015) Technical Specification Group Radio Access Network; Evolved Universal Terrestrial Radio Access (E-UTRA) and Evolved Universal Terrestrial Radio Access Network (E-UTRAN); Overall description; Stage 2 (Release 13)/' 3rd Generation Partnership Project, European Telecommunications Standards Institute, Jun. 2015, 254 pages.

"Managing Groups and ID Pools," Cisco RAN Management System Administration Guide, Release 4.x, Cisco Systems, Inc., Jul. 22, 2014; 46 pages.

"ETSI TS 125 467 V13.0.0 (Jan. 2016) Technical Specification: Universal Mobile Telelecommunications System (UMTS); UTRAN architecture for 3G Home Node B (HNB); Stage 2 (3GPP TS 25.467 version 13.0.0 Release 13)," ETSI, 650 Route des Lucioles F-06921 Sophia Antipolis Cedex—France; Jan. 2016, 93 pages.

"ETSI TS 132 583 V13.0.0 (Feb. 2016) Technical Specification: Universal Mobile Telecommunications System (UMTS); LTE; Telecommunication management; Home Node B (HNB) Operations, 13 Administration, Maintenance and Provisioning (OAM&P); Procedure flows for Type 1 interface HNB to HNB Management System (HMS) (3GPP TS 32.583 version 13.0.0 Release 13)," ETSI, 650 Route des Lucioles F-06921 Sophia Antipolis Cedex—France; Feb. 2016, 22 pages.

ETSI TS 133 320 V13.0.0 (Jan. 2016) Technical Specification: Universal Mobile Telecommunications System (UMTS); LTE; Security of Home Node B (HNB)/Home evolved Node B (HeNB) (3GPP TS 33.320 version 13.0.0 Release 13), ETSI, 650 Route des Lucioles F-06921 Sophia Antipolis Cedex—France; Jan. 2016, 43 pages.

\* cited by examiner

SYSTEM AND METHOD FOR PROVIDING SMALL CELL GATEWAY REDUNDANCY

CROSS-REFERENCE TO RELATED APPLICATIONS

This application is a continuation of co-pending U.S. patent application Ser. No. 14/838,139, filed Aug. 27, 2015. The aforementioned related patent application is herein incorporated by reference in its entirety.

TECHNICAL FIELD

This disclosure relates in general to the field of communications and, more particularly, to a system and method for providing small cell gateway redundancy in a network environment.

BACKGROUND

Networking architectures have grown increasingly complex in communication environments. For example, small cells have gained notoriety due to their capabilities to connect wireless devices to a network. In general terms, small cell radio access points, such as Home eNode Bs (HeNBs), can operate in a licensed spectrum to connect user equipment to the network, often using broadband connections. For a mobile operator, small cell radio access points can offer improvements to both coverage and capacity, which is particularly applicable to indoor networking environments where macro cell networks typically suffer coverage limitations. Small cell radio access points can also offer an alternative networking architecture to enable scalability challenges to be addressed. In particular, there are significant challenges in managing ambiguity and signaling traffic in cases of small cell gateway failures for networks having redundant small cell gateway configurations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One aspect of the present disclosure provides a computer-implemented method, referred to herein as a "gateway redundancy method," for providing small cell gateway redundancy in a network environment. The method could be implemented by a functional entity referred to herein as a "gateway redundancy logic." Various parts of the method could be implemented by one or more of a Radio Access Network (RAN) Management system (RMS), a Home eNode B (HeNB), and Mobility Management Entity. Therefore, in various embodiments, the gateway redundancy logic, or part thereof, could be implemented within any of these network elements or/and distributed among a plurality of network elements.

In one embodiment, the gateway redundancy method includes steps of configuring a HeNB with plurality of global eNode B identities (global eNB IDs), where each global eNB ID is associated with one of a plurality of HeNB gateways (HeNB-GWs), and broadcasting a first global eNB ID by the HeNB when the HeNB is served by a first HeNB-GW. When/if the HeNB loses connectivity with the first HeNB-GW, the method provides a step of switching the broadcasting from the first global eNB ID to a second global eNB ID and re-parenting the HeNB, now broadcasting or is configured to start/continue broadcasting the second global eNB ID, from being served by the first HeNB-GW to being served by a second HeNB-GW.

As will be appreciated by one of ordinary skill in the art, aspects of the present disclosure, in particular the functionality related to providing small cell gateway redundancy described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing HeNBs, RMSs, and various control nodes) or be stored upon manufacturing of these devices and systems.

EXAMPLE EMBODIMENTS

Exemplary Setting for Providing Small Cell Gateway Redundancy

For purposes of illustrating the techniques for providing small cell gateway redundancy in a network environment, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

Figure 1:
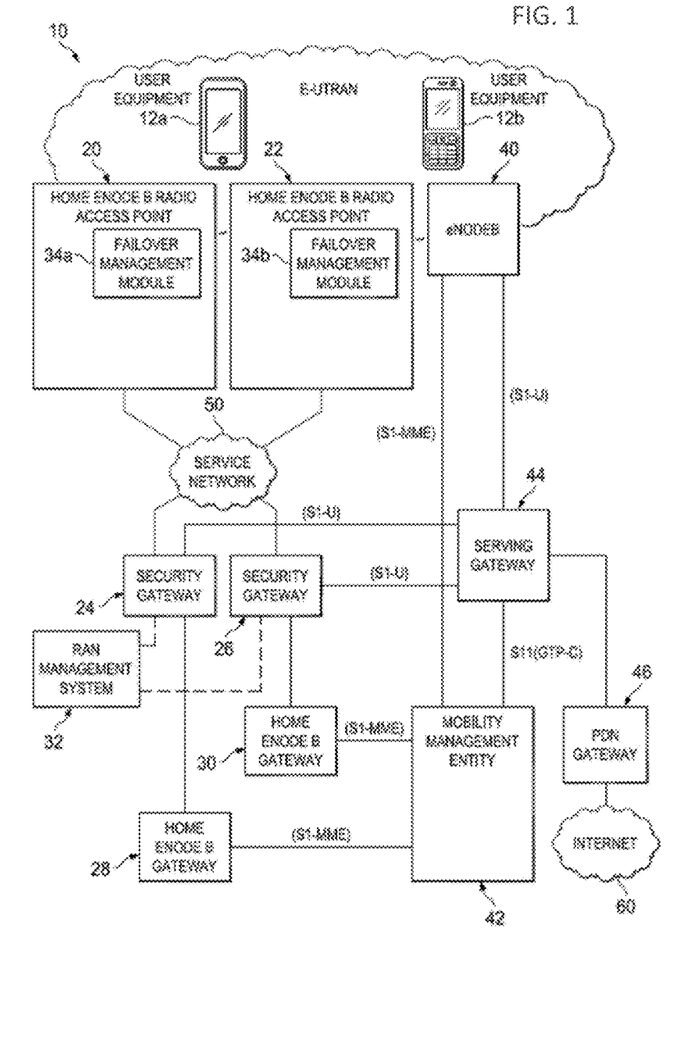
FIG. 1 is a simplified block diagram illustrating an exemplary communication system in a network environment, according to some embodiments of the present disclosure.

An exemplary network in which embodiments of the present disclosure can be implemented is illustrated in FIG. 1, providing a simplified block diagram illustrating a communication system 10 to facilitate providing small cell gateway redundancy in a network environment according to one embodiment of the present disclosure. An exemplary configuration shown in FIG. 1 may be tied to the 3rd Generation Partnership Project (3GPP) Evolved Packet System (EPS) architecture, also sometimes referred to as the Long Term Evolution (LTE) EPS architecture. However, while FIG. 1 illustrates elements of and the present disclosure is described with reference to LTE, embodiments of the present disclosure and the depicted architecture are equally applicable, with modifications as would be apparent to a person of ordinary skill in the art to other telecommunications environments. Thus, in some instances, communication system 10 may include LTE access networks such as evolved UTRAN (E-UTRAN), generally referred to as 4G or LTE. In other instances, communication system 10 may include other access networks such as GSM EDGE radio access network (GERAN), UMTS terrestrial radio access network (UTRAN), generally referred to as 3G, which can be provided using one or more NodeB/Radio Network Controllers (NodeB/RNCs), Home Node B's (HNBs), HNB gateways, Mobile Switching Centers (MSCs), serving General Packet Radio Service (GPRS) support nodes (SGSNs), and gateway GPRS support nodes (GGSNs). In yet other instances, communication system 10 may include non-3GPP networks, such as e.g. WiMAX.

The example architecture of FIG. 1 may include user equipment (UE) 12*a*, 12*b*, Home eNode B (HeNB) radio access points 20, 22, security gateways (SeGWs) 24, 26, HeNB gateways (HeNB-GWs) 28, 30, a Radio Access Network (RAN) Management System (RMS) 32, an eNodeB (eNB) 40, a Mobility Management Entity (MME) 42, a serving gateway (SGW) 44, a Packet Data Network (PDN) gateway (PGW) 46, a service network 50 and an internet 60. HeNBs 20, 22 may each respectively include a failover management module 34*a*-34*b*. As referred to herein in this Specification, a 'HeNB radio access point' may be referred to interchangeably as a 'HeNB access point', 'HeNB', 'small cell radio access point', 'small cell access point', 'small cell', 'femtocell' or 'femto'. HeNBs 20, 22; SeGWs 24, 26 and HeNB-GWs 28, 30 may be configured according to technical report 069 (TR-069) protocol using the TR-196 version 2 (TR-196v2) data model through an Auto Configuration Service (ACS) provided via RMS 32. It should be understood that any number of HeNBs and/or HeNB-GWs may be deployed in communication system 10.

Each of the elements of FIG. 1 may couple to one another through simple interfaces (as illustrated) or through any other suitable connection (wired or wireless), which provides a viable pathway for network communications. HeNBs 20, 22 may interface with SeGWs 24, 26, HeNB-GWs 28, 30 and RMS 32 via service network 50. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs. In various embodiments, internet 60 may overlap with or include service network 50. In one embodiment, HeNB-GWs 28, 30 and SeGWs 24, 26 may be responsible for handling both control and data plane traffic for UE 12*a*-12*b*. In yet another embodiment, HeNB-GWs 28, 30 may be responsible for handling control plane traffic for UE 12*a*-12*b* and SeGWs 24, 26 may be responsible for handling data plane traffic for UE 12*a*-12*b*.

In various embodiments, UE 12*a*-12*b* can be associated with users, employees, clients, customers, etc. wishing to initiate a flow in communication system 10 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 10. UE 12*a*-12*b* may also be inclusive of a suitable interface to a human user such as a microphone, a display, a keyboard, or other terminal equipment.

UE 12*a*-12*b* may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12*a*-12*b* may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

HeNBs 20, 22 can offer suitable connectivity to one or more UE 12*a*-12*b* using any appropriate protocol or technique. In general terms, HeNBs 20, 22 represents a radio access point device that can allow UEs to connect to a wired network using Wi-Fi, Bluetooth™ WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a given UE 12*a*-12*b*. In certain cases, the access point can connect to a router (via a wired network), which can relay data between UE 12*a*, UE 12*b* and other UEs of the network.

In various instances, communication system 10 may include other network elements, gateways, etc. to provide cellular mobile coverage for UE within the system, including, but not limited to one or more Mobile Switching Centers (MSCs), a Home Subscriber Server/Home Location Register (HSS/HLR), one or more Policy and Charging Rules Functions (PCRFs) and/or one or more Authentication, Authorization and Accounting (AAA) elements. These elements are not shown in order to highlight other features of communication system 10.

An Evolved Packet Core (EPC) for a 3GPP EPS architecture typically includes an HSS/HLR, one or more MMEs, one or more SGWs, one or more PGWs, one or more serving gateway support nodes (SGSNs), an AAA element and/or a policy and charging rules function (PCRF). These elements may be provided in the service provider network to provide various UE services and/or functions, to implement (Quality of Service) QoS on packet flows and to provide connectivity for UEs to external data packet networks. The MME is the primary control element for the EPC. Among other things, the MME may provide for UE tracking and paging procedures including, for example, retransmissions, tracking area list management, idle mode UE tracking, etc. The MME may further provide for UE bearer procedures including activation, deactivation and modification; SGW and PGW selection for UE and authentication services. The SGW is a data plane element that can manage user mobility and interfaces with RANs. The SGW also maintains data paths between HeNBs, eNodeBs and the PGW. The PGW provides connectivity for UEs to external packet data networks, such as, for example an internet or other similar network.

Before detailing some of the operational aspects of FIG. 1, it is important to understand common characteristics of HeNBs and HeNB-GWs as they generally operate in commercial architectures. The following foundation is offered earnestly for teaching purposes only and, therefore should not be construed in any way to limit the broad teachings of the present disclosure. In many network architectures, HeNBs can be deployed as autonomous units to improve reception in areas with poor coverage, or within buildings where coverage is reduced by the structure itself.

Essentially, HeNBs are fully featured base stations that can provide proximate coverage in a business (e.g., enterprise) and/or residential environment. Typically, HeNBs operate at lower radio power levels as compared to macro RANs including eNodeBs, etc. HeNBs can be connected using a standard broadband digital subscriber line (DSL), internet, service network and/or cable service into a service provider's core network. Calls can be made and received, where the signals are sent (potentially encrypted) from the HeNB via the broadband IP network to one of the service provider's main switching centers. HeNBs can be provisioned to readily handle 8, 16, 32, etc. concurrent calls. Thus, HeNBs generally operates as a mini tower for a proximate user. As used herein in this Specification, the terms 'user' and 'subscriber' may be used interchangeably.

In order to scale deployments of HeNBs, the LTE architecture beneficially includes the HeNB-GW element. A HeNB-GW enables all HeNBs parented to the gateway to be represented as a single eNB to the remainder of the LTE EPS. In effect, the HeNB-GW presents an aggregate of all of the HeNBs connected to the gateway to the LTE EPS (e.g., the MME). In some instances, the number of TAIs assigned to the HeNBs connected to a HeNB-GW may necessitate the connected HeNBs to be presented to the remainder of the LTE EPS as multiple eNBs.

Figure 2:
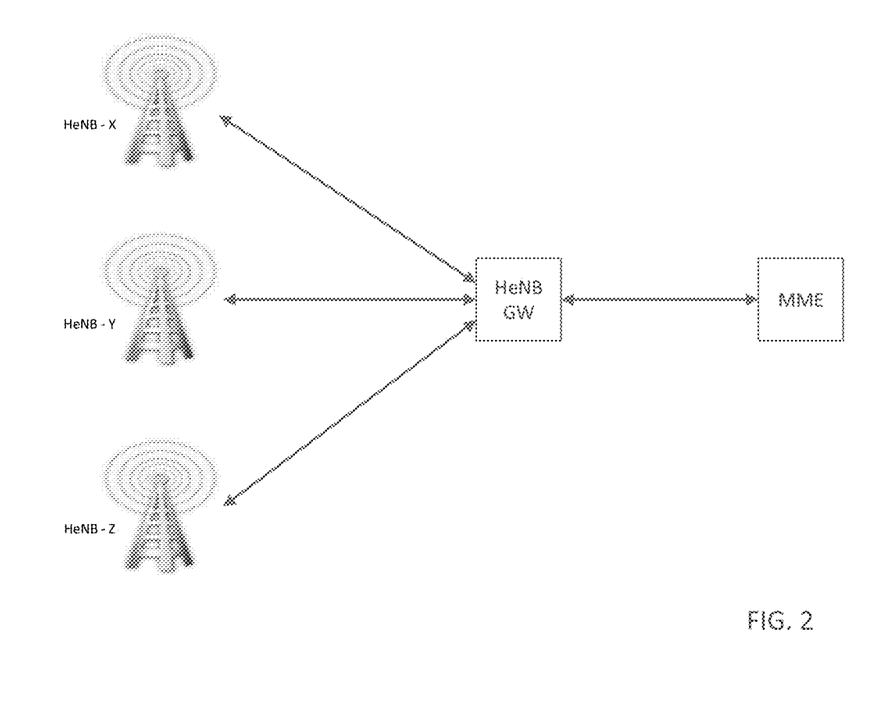
FIG. 2 is a simplified block diagram illustrating exemplary use of a single HeNB-GW in a particular implementation of the communication system.

When a group (or all) of HeNBs can only be parented to a single HeNB-GW, as is illustrated in FIG. 2, failure of this gateway or loss of connectivity of a particular HeNB to this particular gateway may have dire consequences because MME won't be able to communicate with the HeNB that lost the connectivity to that HeNB. Therefore, HeNB-GW redundancy is increasingly being demanded by network service providers to provide robust small cell network coverage.

Prior Art Approaches to Providing Small Cell Gateway Redundancy

Some prior art approaches attempt to provide small cell gateway redundancy using redundant TAIs where a HeNB is configured with a plurality of TAIs, each TAI served by one of a plurality of HeNB-GWs and where a MME is configured with a TAI list that includes the plurality of TAIs. While these approaches may provide reasonably good results, the actual usage in deployment scenarios is questionable for MME vendors that do not use a TAI based approach for selecting HeNB behind a HeNB-GW. Additionally, these approaches are very dependent on intelligent TAI list being implemented in a MME. Another potential limitation is that, currently, UE TAI Lists may just contain 16 entries. Making half of them as standby/backup reduces the number of active TAI list of UE and consequently causes more tracking area updates (TAUs) and different deployment scenarios.

It would be desirable to find methods and systems for providing small cell gateway redundancy that would improve on one or more of these drawbacks.

Proposed Techniques for Providing Small Cell Gateway Redundancy

In accordance with one embodiment, communication system 10 can overcome the aforementioned shortcomings (and others) by implementing a method (the gateway redundancy method) based on associating a single HeNB with multiple different global eNB IDs (also referred to herein as "cell identities (Cis)").

Figure 3A:
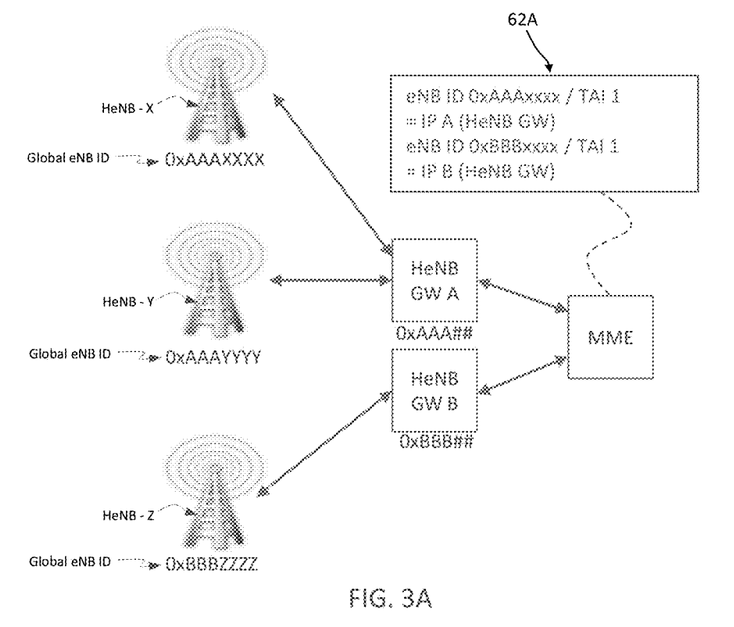
FIGS. 3A-3C are simplified block diagrams illustrating problems with using a single global eNB ID for each HeNB.
Figure 3B:
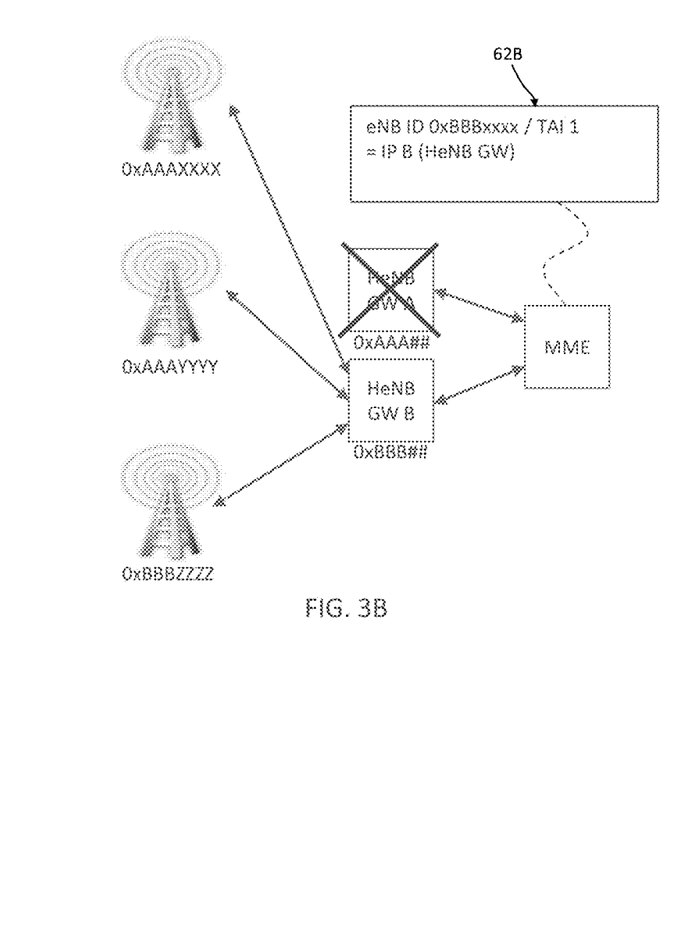
Figure 3C:
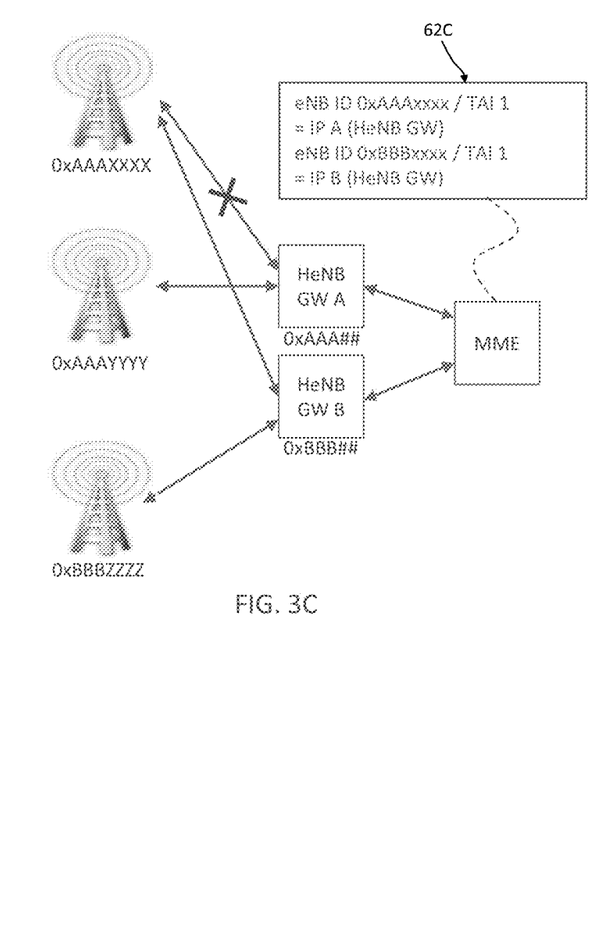

Embodiments of the present disclosure are based on recognition that employing redundant HeNB-GWs but continuing using only a single global eNB ID leads to problems as illustrated in FIGS. 3A-3C.

FIG. 3A illustrates a part of a communication system, such as e.g. communication system 10, showing an example of three HeNBs (such as e.g. HeNBs 20, 22 in FIG. 1) denoted in the FIGURE as HeNB-X, HeNB-Y, and HeNB-Z. Each of the three HeNBs has its respective global eNB ID. For the example shown in FIG. 3A, HeNB-GW A is the default gateway for HeNB-X and HeNB-Y and is a secondary gateway for HeNB-Z, while HeNB-GW B is the default gateway for HeNB-Z and is a secondary gateway for HeNB-X and HeNB-Y.

In current HeNB and MME deployments, all HeNBs behind the same HeNB-GW use matching first N bits matching to the ID of their HeNB-GW. In the example of FIG. 3A, global eNB ID of HeNB-GW A is shown as 0xAAA ##, while global eNB ID of HeNB-GW A is shown as 0xBBB ##. Therefore, the global eNB ID of HeNB X may be expressed as 0xAAAXXXX and the global eNB ID of HeNB Y may be expressed as 0xAAAYYYY, where the first part "0xAAA"" of these global IDs is the N-bit part matching the first N bits of the global eNB ID of their default gateway HeNB-GW A. Similarly, the global eNB ID of HeNB Z may be expressed as 0xBBBZZZZ, where the first part "0xBBB" of this global ID is the N-bit part matching the first N bits of the global eNB ID of the corresponding default gateway HeNB-GW B. Remaining bits shown in FIG. 3 as XXXX, YYYY, ZZZZ, and ## could be any bits that result in respective unique IDs.

Table 62A illustrates a MME eNB IP address table for the example depicted in In FIG. 3A. When each of the HeNBs shown in FIG. 3A is behind its respective default HeNB-GW (i.e. there is no loss of connectivity to any of the gateways), MME shown in FIG. 3A, e.g. the MME 42 shown in FIG. 1, can reach all of the HeNBs.

FIGS. 3B and 3C continue with the example described for FIG. 3A and illustrate situations where connectivity was lost for some reasons. FIGS. 3B and 3C illustrate the same elements as shown in FIG. 3A but leave out some of the notations provided in FIG. 3A in order to not clutter these drawings.

FIG. 3B illustrates an example where HeNB-GW A fails in a catastrophic way (as shown in the FIGURE with a cross on that gateway). As a result of such a failure, the MME will delete S1 association for the failed GW and HeNBs that were previously served by the gateway will re-parent to a secondary HeNB-GW. For the example shown in FIG. 3B, this means that the entry for the HeNB-GW A will be deleted from the address table 62B in the MME and HeNB X and HeNB Y will re-parent to the secondary gateway HeNB-GW B. One problem with such a scenario is that re-parented HeNBs still continue broadcasting their assigned global eNB IDs which point to the gateway HeNB-GW A (because their first N bits match with the ID of that gateway). Consequently, HandIn messages to re-parented HeNBs with secondary HeNB-GW will fail because the MME will not be able to reach out to them.

FIG. 3C illustrates an example where HeNB-GW A remains active but one or more HeNBs (but not all) loose connectivity (e.g. due to a link failure or software fault on HeNB-GW) and re-parents to a secondary HeNB-GW. Example shown in FIG. 3C illustrates that HeNB X lost connectivity to HeNB-GW A and re-parents to the secondary gateway HeNB-GW B. One problem with this scenario is that, again, re-parented HeNB still continues broadcasting its assigned global eNB ID which points to the gateway HeNB-GW A. Consequently, HandIn messages to re-parented HeNB X with secondary HeNB-GW will fail because the MME will not be able to reach out to HeNB X via HeNB-GW B. MME still sends Handover message to primary HeNB-GW A.

Proposed gateway redundancy method and system improve on these problems, as well as at least on some problems of the prior art approaches described above by providing a HeNB with two or more global eNB IDs (preferably with as many global eNB IDs as there are HeNB-GWs to which the HeNB can parent to). Each global eNB ID of a HeNB corresponds to or points to a different one of HeNB-GW to which the HeNB can parent to. The HeNB is configured to broadcast corresponding global eNB ID when parented to a particular HeNB-GW. Thus, upon re-parenting to a different HeNB-GW, HeNB switches broadcasting of global eNB ID to that corresponding to the new HeNB-GW.

Such an approach allows supporting HeNB-GW redundancy without requiring any changes at the MME for static TAI list configuration to accommodate standby TAIs. In addition, this approach avoids wasting of secondary TAIs because all HeNBs behind a HeNB-GW are supposed to use the same TAI configured at the HeNB-GW and only 256 TAIs can be configured as part of HeNB-GW (which is a limitation of S1AP protocol). Furthermore, the approach allows re-using TAIs at HeNB-GWs and Macro eNBs, thus minimizing and/or avoiding S1AP signalling (specifically TAUs).

Figure 4:
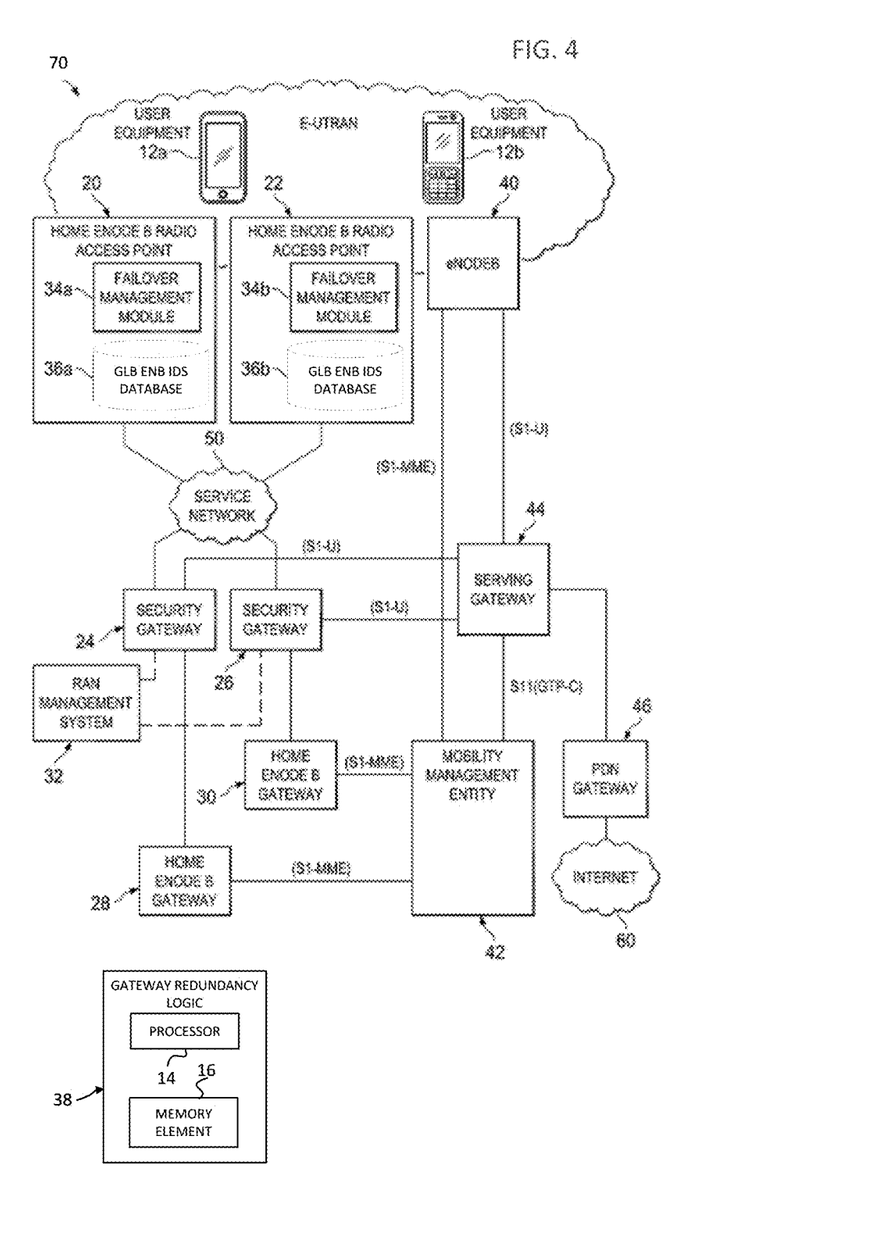
FIG. 4 is a simplified block diagram illustrating an exemplary communication system for providing small cell gateway redundancy in a network environment, according to some embodiments of the present disclosure.

FIG. 4 is a simplified block diagram illustrating an exemplary communication system 70 for providing small cell gateway redundancy in a network environment, according to some embodiments of the present disclosure. The communication system 70 is similar to communication system 10 illustrated in FIG. 1 and, therefore, the description of the system provided with reference to FIG. 1 is applicable here and is not repeated. In addition, communication system 70 further includes a gateway redundancy logic 38. Various repositories may be associated with the gateway redundancy logic 38, for example including, but not limited to, global eNB IDs databases 36a and 36b as well as other repositories not shown in FIG. 4. Even though the gateway redundancy logic 38 is illustrated as a separate element in the networks illustrated in FIG. 4, the gateway redundancy logic 38 may be implemented as or in any other network element of FIG. 4, e.g. in the RMS 32 or in the HeNBs 20 and 22, or distributed over a number of network elements shown in FIG. 4. Furthermore, while global eNB IDs databases 36a and 36b are shown in FIG. 4 to be parts of the HeNBs 20, 22, respectively, in other embodiments, such databases may be included in other network elements, e.g. in the RMS 32, or distributed over a number of network elements shown in FIG. 4.

Note that in certain examples, certain databases (e.g., for storing global eNB ID information and the like) can be consolidated with memory elements (or vice versa), or the storage can overlap/exist in any other suitable manner. UE 12a-12b, service network 50 and internet 60 are also shown in FIG. 4.

In one example implementation, HeNBs 20, 22; SeGWs 24, 26; HeNB-GWs 28, 30; RMS 32, eNodeB 40, MME 42, SGW 44, PGW 46, and gateway redundancy logic 38 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide HeNB-GW redundancy (e.g., for networks such as those illustrated in FIG. 4). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 70, gateway redundancy logic 38 may include at least one processor 14 and at least one memory element 16, along with any other suitable hardware and/or software to enable its intended functionality of ensuring gateway redundancy as described herein. Similarly, each of HeNBs 20, 22; SeGWs 24, 26; HeNB-GWs 28, 30; RMS 32, eNodeB 40, MME 42, SGW 44 and PGW 46 may include memory elements for storing information to be used in achieving the HeNB-GW redundancy operations, as outlined herein, and a processor that can execute software or an algorithm to perform the HeNB-GW failover activities as discussed in this Specification. Any of these devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to gateway redundancy logic 38; HeNBs 20, 22; SeGWs 24, 26; HeNB-GWs 28, 30; RMS 32, eNodeB 40, MME 42, SGW 44, and PGW 46 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and user equipment (e.g., mobile nodes) can also include suitable interfaces for receiving, transmitting, and/or otherwise communicating data or information in a network environment.

Note that in certain example implementations, the HeNB-GW redundancy and/or failover mechanisms/functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 4] can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors [as shown in FIG. 4] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

The solution provided by communication system 70 may allow for active (A) and standby (S) SeGWs 24, 26 and HeNB-GWs 28, 30 to be defined for small cells (e.g., HeNBs 20, 22) within the system. Note the term 'active plus standby' may be referred to herein in this Specification as (A+S). Multiple A+S SeGWs 24, 26 and HeNB-GWs 28, 30 may be configured by a network service provider using RMS 32. Using TR-069/TR-196v2 with extensions to A+S definitions, a network service provider, via RMS 32, may provide HeNBs 20, 22 with the multiple A+S SeGW and HeNB-GW definitions as configured for SeGWs 24, 26 and HeNB-GWs 28, 30. The A+S configurations may be associated with different global eNB IDs (also referred to as cell IDs (Cis)), which may also be configured using TR-069/TR-196v2 with A+S extensions.

For a deployment including the HeNB-GW redundancy scheme as provided by communication system 10, each HeNB may be provided with a primary (active) CI in the system and may further have one or more corresponding dormant secondary (backup) CIs associated with it (e.g., CI #1 to CI # n). This could result in doubling, tripling, etc. the number of CIs defined across the system. Each HeNB 20, 22 may, via CI databases 36a, 36b, respectively be configured with a primary CI and one or more backup or secondary CIs. As described in greater detail below, such approach does not require changes in the MME 42, unlike prior art approaches where it was necessary to configure the MME with a TAI list database in order to support a static TAI list comprising the plurality of TACs/TAIs configured for HeNBs as well as any eNBs that may have a coverage overlapping, at least in part, coverage areas provided by the HeNBs.

Each HeNB 20, 22 may be configured to parent (e.g., register) to a corresponding active SeGW 24, 26 and a corresponding active HeNB-GW 28, 30. For example, SeGW 24/HeNB-GW 28 may be configured via RMS 32 as an active parent for HeNB 20 and SeGW 26/HeNB-GW 30 may configured as a standby or secondary (backup) parent; while SeGW 26/HeNB-GW 30 may be configured as an active parent for HeNB 22 and SeGW 24/HeNB-GW 28 may be configured as a standby parent. It should be understood that this active/standby configuration is provided for illustrative purposes only and is not meant to limit the scope of the present disclosure. Any active/standby configuration could be defined for HeNBs 20, 22.

Additionally, each HeNB 20, 22 can respectively perform Internet Protocol Security (IPsec) set-ups with SeGWs 24, 26, depending on a configuration provided via RMS 32. IPsec can use cryptographic security services to protect communications over Internet Protocol (IP) networks. For example, communications over service network 50 between HeNBs 20, 22, SeGWs 24, 26, HeNB-GWs 28, 30, SGW 44, PGW 46, etc. IPsec can support network-level peer authentication, data origin authentication, data integrity, data confidentiality (encryption), and replay protection. Implementation of IPsec can be based on Internet Engineering Task Force (IETF) standards. Based on a configuration provided by RMS 32, SeGWs 24, 26 can perform authentication and obtain an assigned IPsec address for HeNBs 20, 22 from an IP assignment server (not shown), which could be a separate dynamic host configuration protocol (DHCP) server, a local service on SeGWs 24, 26, another IP assignment entity, etc.

HeNBs 20, 22 may be defined to use 'keep-alive' techniques to determine whether to switch from an active to standby SeGW/HeNB-GW in case connectivity to a corresponding parent gateway is lost. In one or more embodiments, keep alive techniques can include IPSec Dead Peer Detection to an SeGW and/or Stream Control Transmission Protocol (SCTP) heartbeat to an HeNB-GW. During operation, if connectivity is lost with a parent (e.g., a HeNB-GW failover), a given HeNB may switch from an active to standby HeNB-GW using HeNB-GW failover techniques as described herein. When switching from an active to standby HeNB-GW, the global eNB ID broadcast by a HeNB may be updated to reflect a standby HeNB-GW which will be serving the HeNB once the HeNB re-parents to this standby HeNB-GW (HeNBs may have multiple standby definitions) based on a backup configuration provided by RMS 32.

The solution provided by communication system 70 may, similarly, allow for 'active plus active' (A+A) SeGWs 24, 26 and HeNB-GWs 28, 30 to be defined for small cells (e.g., HeNBs 20, 22) within the system. Multiple A+A SeGWs 24, 26 and HeNB-GWs 28, 30 may be configured by a network service provider using RMS 32. Using TR-069/TR-196v2 with extensions to A+A definitions, a network service provider, via RMS 32, may provide HeNBs 20, 22 with the multiple A+A SeGW and HeNB-GW definitions as configured for SeGWs 24, 26 and HeNB-GWs 28, 30. The A+A configurations may be associated with different global eNB IDs (also referred to as cell IDs (Cis)), which may also be configured using TR-069/TR-196v2 with A+A extensions. In some embodiments, communication system 70 may be configured to have a pool of Active HeNB-GWs (M+1) with RMS providing the weight factors to HeNB along with global eNB ID and HeNB-GW IP address through TR-069/TR-196v2. Thus, in case of failure of the Active HeNBGW, the affected HeNBs can be evenly or through a weight factor distributed across other M active HeNBGWs in the pool. Since commercial MME uses intelligent Paging anyways to page last EnodeB/last N enodeBs, having the same TAI on secondary Active HeNBGW is not a major issue.

The solution provided by communication system 70 may be further enhanced to even switch the TAC along the Global EnodeB ID in case of failover to overcome the unintelligent MME implementation.

Figure 5A:
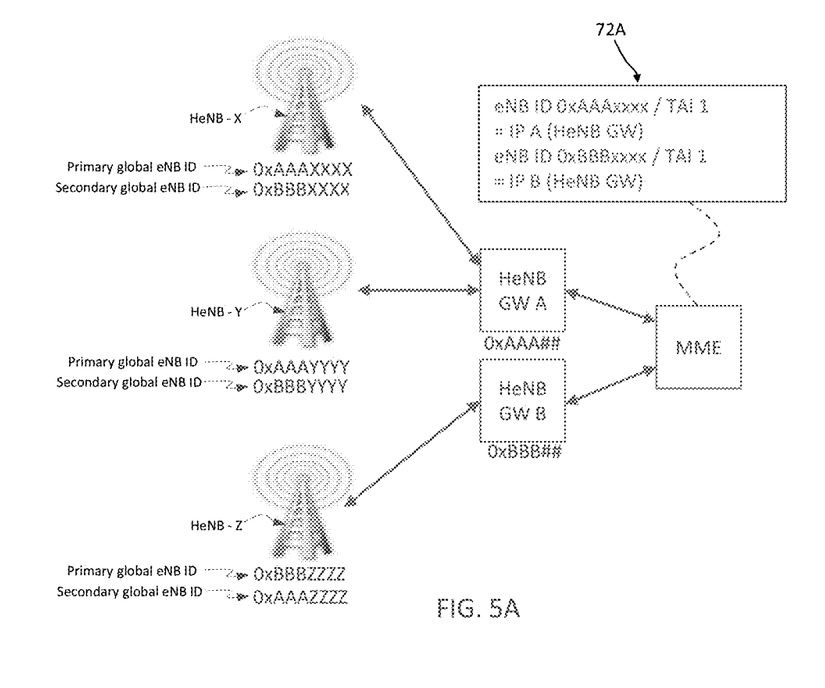
FIGS. 5A-5C are simplified block diagrams illustrating using a plurality of global eNB IDs for each HeNB, according to some embodiments of the present disclosure.
Figure 5B:
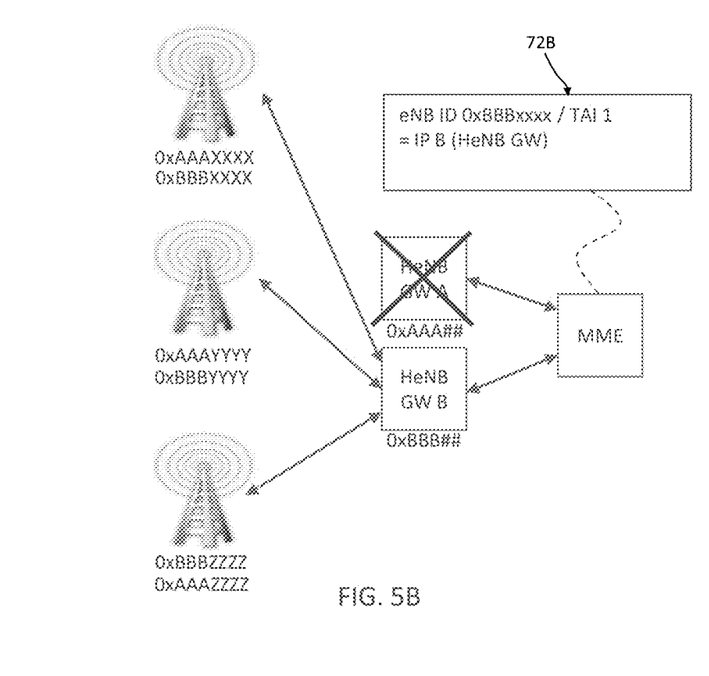
Figure 5C:
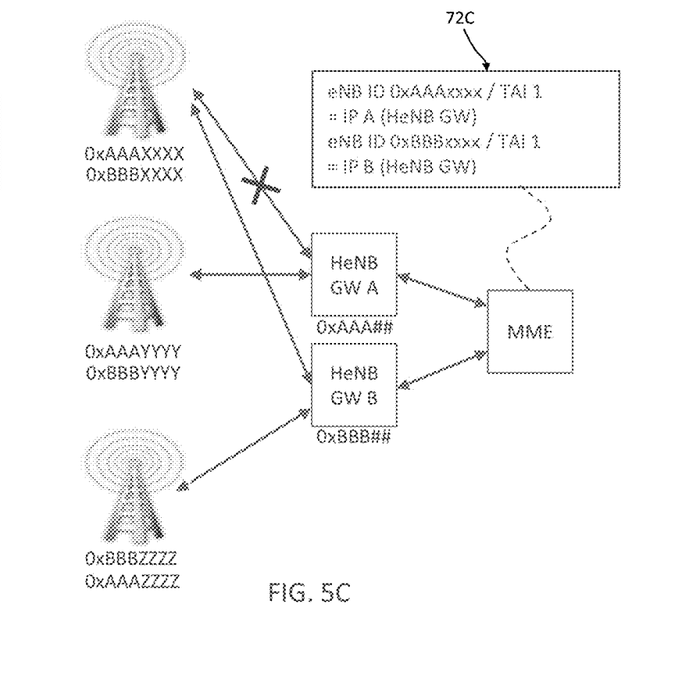

Consider an example shown in FIGS. 5A-5C. Similar to FIG. 3A described above, FIG. 5A illustrates a part of a communication system, such as e.g. communication system 70 of FIG. 4, showing an example of three HeNBs (such as e.g. HeNBs 20, 22 in FIG. 4) denoted in the FIGURE as HeNB-X, HeNB-Y, and HeNB-Z. Each of the three HeNBs has its respective primary global eNB ID. For the example shown in FIG. 5A, HeNB-GW A is the default gateway for HeNB-X and HeNB-Y and is a secondary gateway for HeNB-Z, while HeNB-GW B is the default gateway for HeNB-Z and is a secondary gateway for HeNB-X and HeNB-Y. Global eNB ID of HeNB-GW A is shown in FIG. 5A as 0xAAA ##, while global eNB ID of HeNB-GW A is shown as 0xBBB ##. Because, as described above, in current HeNB and MME deployments all HeNBs behind the same HeNB-GW use matching first N bits matching to the ID of their HeNB-GW, in the example of FIG. 5A, the primary global eNB ID of HeNB X may be expressed as 0xAAAXXXX and the primary global eNB ID of HeNB Y may be expressed as 0xAAAYYYY, where the first part "0xAAA"" of these global IDs is the N-bit part matching the first N bits of the global eNB ID of their default gateway HeNB-GW A. Similarly, primary the global eNB ID of HeNB Z may be expressed as 0xBBBZZZZ, where the first part "0xBBB" of this global ID is the N-bit part matching the first N bits of the global eNB ID of the corresponding default gateway HeNB-GW B. Thus, a primary global eNB ID of an HeNB corresponds, or points to (i.e. indicates), a respective default HeNB-GW for the HeNB, in that the global eNB ID shares first N bits with the global eNB ID of the gateway that serves the HeNB when the HeNB is broadcasting that global eNB ID.

Remaining bits shown in FIG. 5 as XXXX, YYYY, ZZZZ, and ## could be any bits that result in respective unique IDs. In various embodiments, number of bits in each ID could, of course, be different than what is shown in FIG. 5A. Typically, HeNB ID is 28 bit (7 nibbles), while HeNB-GW ID is 20 bit (5 nibbles).

In addition to having primary global eNB IDs, each HeNB is further configured with at least one secondary global eNB ID. The communication system is configured so that each one of the secondary global eNB IDs corresponds or points to (i.e. indicates) a different one of the secondary HeNB-GWs (there could be multiple secondary gateways) in that each secondary global eNB ID shares the first N bits with the global eNB ID of the particular secondary HeNB-GW that will be serving the HeNB after the HeNB re-parents to that gateway and starts broadcasting that corresponding global eNB ID. Because, in the example shown in FIG. 5A, HeNB-GW A is the secondary gateway for HeNB-Z, while HeNB-GW B is the secondary gateway for HeNB-X and HeNB-Y, the secondary global eNB ID of HeNB X may be expressed as 0xBBBXXXX, the secondary global eNB ID of HeNB Y may be expressed as 0xBBBYYYY, and the secondary the global eNB ID of HeNB Z may be expressed as 0xAAAZZZZ.

It should be noted that, while some of the descriptions provided herein refer to "primary" and "secondary" global eNB IDs in context of default and backup/standby gateways, in general, teachings described herein are applicable to any configurations where a HeNB may be parented to multiple HeNB-GWs and there does not have to be default/backup distinction. Thus, such descriptions may be repeated by referring to "primary" and "default" as "first" and by referring to "secondary" and "backup/standby" as "second". Furthermore, while descriptions provided herein describe that each HeNB are configured with multiple global eNB IDs, in other embodiments only some of the HeNBs may be so configured.

Table 72A illustrates a MME eNB IP address table for the example depicted in In FIG. 5A. When each of the HeNBs shown in FIG. 5A is behind its respective default HeNB-GW (i.e. there is no loss of connectivity to any of the gateways), MME shown in FIG. 5A, e.g. the MME 42 shown in FIG. 4, can reach all of the HeNBs.

FIGS. 5B and 5C continue with the example described for FIG. 5A and illustrate situations where connectivity was lost for some reasons. FIGS. 5B and 5C illustrate the same elements as shown in FIG. 5A but leave out some of the notations provided in FIG. 5A in order to not clutter these drawings.

FIG. 5B illustrates an example where HeNB-GW A fails in a catastrophic way (as shown in the FIGURE with a cross on that gateway). As a result of such a failure, the MME will delete S1 association for the failed GW and HeNBs that were previously served by the gateway will re-parent to a secondary HeNB-GW with secondary global eNB ID. For the example shown in FIG. 5B, this means that the entry for the HeNB-GW A will be deleted from the address table 72B in the MME and HeNB X and HeNB Y will re-parent to the secondary gateway HeNB-GW B. In contrast to a similar scenario described with reference to FIG. 3B, this time, re-parented HeNBs are configured to switch broadcasting of their respective assigned global eNB IDs to point to the new gateway to which they re-parented, in this example to HeNB-GW B. Thus, in the example of FIG. 5B, upon re-parenting to the secondary gateway HeNB-GW B, HeNB X and HeNB Y will start broadcasting their secondary global eNB IDs, 0xBBBXXX and 0xBBBYYYY, respectively, because these are the global eNB IDs corresponding to the gateway to which they are parented to. Consequently, HandIn messages to re-parented HeNBs with secondary HeNB-GW will reach the re-parented HeNBs because the MME will be able to reach out to them via the remaining entry for HeNB-GW B of table 72B.

FIG. 5C illustrates an example where HeNB-GW A remains active but one or more HeNBs (but not all) loose connectivity (e.g. due to a link failure or software fault on HeNB-GW) and re-parents to a secondary HeNB-GW with secondary global eNB ID. Example shown in FIG. 5C illustrates that HeNB X lost connectivity to HeNB-GW A and re-parents to the secondary gateway HeNB-GW B. In contrast to a similar scenario described with reference to FIG. 3C, this time, again, re-parented HeNB will switch broadcasting of its assigned primary global eNB ID which points to the gateway HeNB-GW A to its assigned secondary global eNB IDs to point to the new gateway to which the HeNB re-parented, in this example to HeNB-GW B. Thus, in the example of FIG. 5C, upon re-parenting to the secondary gateway HeNB-GW B, HeNB X will start broadcasting its secondary global eNB ID 0xBBBXXX that points to the new gateway. Consequently, HandIn messages to re-parented HeNB X with secondary HeNB-GW will reach the re-parented HeNB because the MME will be able to reach HeNB X via the entry for HeNB-GW B of table 72C.

Figure 6:
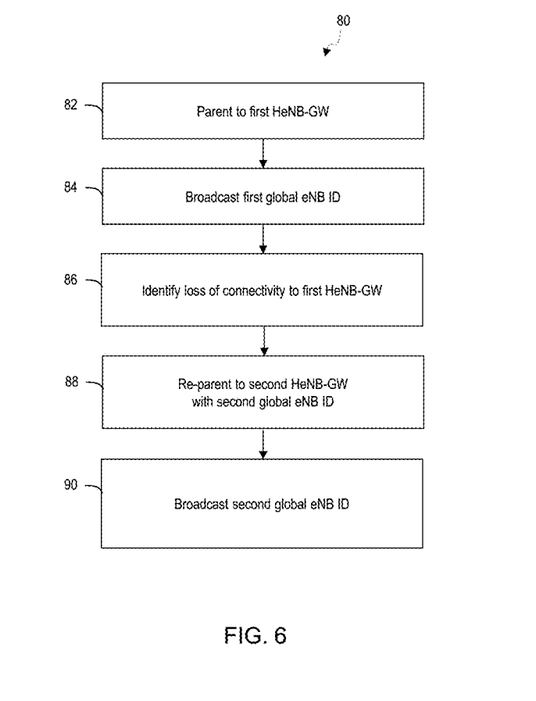
FIG. 6 is a simplified flow diagram illustrating example operations associated with providing small cell gateway redundancy in a network environment in various potential embodiments of the present disclosure.

FIG. 6 is a simplified flow diagram illustrating example operations 80 associated with providing small cell gateway redundancy in a network environment in various potential embodiments of the present disclosure.

Operations of FIG. 6 may be described with reference to communication system 70, in which e.g. HeNB 20, via global eNB IDs database 36a, has been configured with a first global eNB ID #20-1 and a second global eNB ID #20-2. Similarly, HeNB 22 may be configured, via global eNB IDs database 34b, with a first global eNB ID #22-1 and a second global eNB ID #22-2. In an embodiment, the HeNBs may be configured with multiple global eNB IDs by the RMS 32, in accordance with TR-069/TR-196v2. Further assume that HeNB 20 has been configured (e.g. by the RMS 32) to broadcast its first global eNB ID #20-1 when parented to a first HeNB-GW, e.g. HeNB-GW 28 shown in FIG. 4, and to broadcast its second global eNB ID #20-2 when parented to a second HeNB-GW, e.g. HeNB-GW 30 shown in FIG. 4. Similarly, HeNB 22 may be configured (e.g. by the RMS 32) to broadcast its first global eNB ID #22-1 when parented to a gateway that is considered a corresponding first HeNB-GW for that HeNB, e.g. HeNB-GW 30 shown in FIG. 4 (in general, it does not have to be a different gateway from HeNB 20), and to broadcast its second global eNB ID #22-2 when parented to its second HeNB-GW, e.g. HeNB-GW 28 shown in FIG. 4.

The operations of FIG. 6 are now described with reference to one HeNB, e.g. HeNB 20, but analogous steps may be performed for other HeNBs configured with multiple global eNB IDs. In this context, the method 80 may begin with step 82, where HeNB 20 parents to its first HeNB-GW, GW 28, which could be a default gateway for this HeNB.

In step 84, HeNB 20 parented to the first HeNB-GW broadcasts its first global eNB ID #20-1. In an embodiment, the first global eNB ID may be the primary global eNB ID configured for the HeNB.

In step 86, HeNB 20 determines whether loss of connectivity (also referred as failover or connection failure) to the first HeNB-GW has occurred. If no connection failure has occurred, the HeNB may continue to broadcast its first global eNB ID #20-1. However, if a connection failure has occurred, the HeNB may re-parent to a second HeNB-GW. FIG. 6 illustrates that, triggered by the identification of the loss of connectivity in step 86, in step 88 HeNB 20 re-parents to the second HeNB-GW using its second global eNB ID #20-2. In step 90, HeNB 20, now parented to the second HeNB-GW, broadcasts its second global eNB ID #20-2. Thus, in this example, on a failover of HeNB-GW 28, HeNB 20, using failover management module 34a, may re-parent to HENB-GW 30 and may switch its broadcast from first (e.g. primary) global eNB ID #20-1 to second (e.g. backup) global eNB ID #20-2.

In some embodiments, providing redundant HeNB-GWs to which a HeNB may connect to may include providing what may be considered as a "priority list" indicating policies, rules, or/and order that a HeNB is configured to take into consideration when selecting a new HeNB-GW to re-parent to upon failover of the primary HeNB-GW. For example, a weight factor may be assigned to each second HeNB-GW and HeNB be configured to select a particular second HeNB-GW from a plurality of such secondary gateways based on the weight factor. A person of ordinary skill in the art will recognize considerations which may be relevant in assigning such weight factors (e.g. for assigning by the RMS), such as e.g. load-balancing considerations or/and capabilities of individual HeNB-GW in a pool of HeNB-GW's, which may either be pre-configured at the HeNBs or dynamically configured/provided (e.g. by the RMS) upon the detection of failure of the primary HeNB-GW or loss of connectivity to the primary HeNB-GW, all of which are within the scope of the present disclosure.

After step 90, upon receiving a mobility event for UE 12a served by HeNB 20, MME 42 will signal HeNB-GW 30 because the global HeNB ID broadcast by HeNB 20 now points to this gateway. Thus, the solution provided by communication system 70 may provide a mechanism to support HeNB-GW redundancy. Additionally, no changes are required on the MME side as the MME just continues functioning in accordance with its MME eNB IP address table and global eNB IDs broadcast by HeNBs.

It is important to note that the steps in the appended diagrams illustrate only some of the possible signaling scenarios and patterns that may be executed by, or within, communication system 70. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by communication system 70 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method comprising:
configuring a Home eNode B (HeNB) with a plurality of global eNode B identities (global eNB IDs), wherein each global eNB ID identifies one of a plurality of HeNB gateways (HeNB-GWs);
broadcasting a first global eNB ID, of the plurality of global eNB IDs, by the HeNB when the HeNB is served by a first HeNB-GW, wherein the first global eNB ID identifies the first HeNB-GW;
re-parenting the HeNB, from being served by the first HeNB-GW identified by the first global eNB ID to being served by a second HeNB-GW identified by a second global eNB ID of the plurality of global eNB IDs, based on determining that the HeNB loses connectivity with the first HeNB-GW; and broadcasting, by the HeNB after the re-parenting, the second global eNB ID instead of the first global eNB ID.

2. The method according to claim 1, further comprising selecting, when the HeNB loses connectivity with the first HeNB-GW and prior to the re-parenting, the second HeNB-GW from the plurality of HeNB gateways based on a weight factor.

3. The method according to claim 1, wherein a tracking area identity (TAI) of the HeNB when the HeNB is served by the first HeNB-GW is the same as the TAI of the HeNB when the HeNB is served by the second HeNB-GW.

4. The method according to claim 1, wherein re-parenting the HeNB from being served by the first HeNB-GW to being served by the second HeNB-GW comprises the HeNB sending to the second HeNB-GW a setup request comprising the second global eNB ID.

5. The method according to claim 1, wherein, when the HeNB is served by the first HeNB-GW, the first HeNB-GW is an active HeNB-GW and the second HeNB-GW is a standby HeNB-GW.

6. The method according to claim 1, wherein both the first HeNB-GW and the second HeNB-GW are active HeNB-GWs when the HeNB is served by the first HeNB-GW.

7. The method according to claim 1, further comprising communicating the plurality of global eNB IDs to a user equipment (UE) when the UE attaches to the HeNB.

8. One or more non-transitory tangible media encoding logic that include instructions for execution that, when executed by a processor, are operable to perform operations comprising:
configuring a Home eNode B (HeNB) with a plurality of global eNode B identities (global eNB IDs), wherein each global eNB ID identifies one of a plurality of HeNB gateways (HeNB-GWs);
broadcasting a first global eNB ID, of the plurality of global eNB IDs, by the HeNB when the HeNB is served by a first HeNB-GW, wherein the first global eNB ID identifies the first HeNB-GW;
re-parenting the HeNB, from being served by the first HeNB-GW identified by the first global eNB ID to being served by a second HeNB-GW identified by a second global eNB ID of the plurality of global eNB IDs, based on determining that the HeNB loses connectivity with the first HeNB-GW; and
broadcasting, by the HeNB after the re-parenting, the second global eNB ID instead of the first global eNB ID.

9. The media according to claim 8, the operations further comprising selecting, when the HeNB loses connectivity with the first HeNB-GW and prior to the re-parenting, the second HeNB-GW from the plurality of HeNB gateways based on a weight factor.

10. The media according to claim 8, wherein a tracking area identity (TAI) of the HeNB when the HeNB is served by the first HeNB-GW is the same as the TAI of the HeNB when the HeNB is served by the second HeNB-GW.

11. The media according to claim 8, wherein re-parenting the HeNB from being served by the first HeNB-GW to being served by the second HeNB-GW comprises the HeNB sending to the second HeNB-GW a setup request comprising the second global eNB ID.

12. The media according to claim 8, the operations further comprising communicating the plurality of global eNB IDs to a user equipment (UE) when the UE attaches to the HeNB.

13. The media according to claim 8, wherein, when the HeNB is served by the first HeNB-GW, the first HeNB-GW is an active HeNB-GW and the second HeNB-GW is a standby HeNB-GW.

14. The media according to claim 8, wherein both the first HeNB-GW and the second HeNB-GW are active HeNB-GWs when the HeNB is served by the first HeNB-GW.

15. An apparatus, comprising:
a Home eNode B (HeNB);
at least one memory element configured to store computer executable instructions, and
at least one processor coupled to the at least one memory element and configured, when executing the instructions, to:
configure the HeNB with plurality of global eNode B identities (global eNB IDs), wherein each global eNB ID identifies one of a plurality of HeNB gateways (HeNB-GWs);
broadcast a first global eNB ID, of the plurality of global eNB IDs, by the HeNB when the HeNB is served by a first HeNB-GW, wherein the first global eNB ID identifies the first HeNB-GW; and
re-parent the HeNB, from being served by the first HeNB-GW identified by the first global eNB ID to being served by a second HeNB-GW identified by a second global eNB ID of the plurality of global eNB IDs, based on determining that the HeNB loses connectivity with the first HeNB-GW; and
broadcasting, by the HeNB after the re-parenting, the second global eNB ID instead of the first global eNB ID.

16. The apparatus according to claim 15, wherein the at least one processor is further configured to select, when the HeNB loses connectivity with the first HeNB-GW and prior to the re-parenting, the second HeNB-GW from the plurality of HeNB gateways based on a weight factor.

17. The apparatus according to claim 15, wherein a tracking area identity (TAI) of the HeNB when the HeNB is served by the first HeNB-GW is the same as the TAI of the HeNB when the HeNB is served by the second HeNB-GW.

18. The apparatus according to claim 15, wherein re-parenting the HeNB from being served by the first HeNB-GW to being served by the second HeNB-GW comprises the HeNB sending to the second HeNB a setup request comprising the second global eNB ID.

19. The apparatus according to claim 15, wherein, when the HeNB is served by the first HeNB-GW, the first HeNB-GW is an active HeNB-GW and the second HeNB-GW is a standby HeNB-GW.

20. The apparatus according to claim 15, wherein both the first HeNB-GW and the second HeNB-GW are active HeNB-GWs when the HeNB is served by the first HeNB-GW.

* * * * *